United States Patent

Woydich

Patent Number: 5,589,951
Date of Patent: Dec. 31, 1996

[54] PAD FOR USE IN SCANNING DATA STORED ON A FLAT SURFACE

[76] Inventor: Horst Woydich, Auf der Haid, 37, D-8190 Wolfratshausen, Germany

[21] Appl. No.: 175,341

[22] PCT Filed: Jul. 3, 1992

[86] PCT No.: PCT/EP92/01510

§ 371 Date: Jan. 4, 1994

§ 102(e) Date: Jan. 4, 1994

[87] PCT Pub. No.: WO93/01678

PCT Pub. Date: Jan. 21, 1993

[30] Foreign Application Priority Data

Jul. 4, 1991 [DE] Germany ............ 41 22 205.9
Oct. 29, 1991 [DE] Germany ............ 41 35 626.8

[51] Int. Cl.⁶ .................. H04N 1/00; H04N 1/024
[52] U.S. Cl. ................ 358/473; 358/406; 382/313
[58] Field of Search .................. 358/473, 474, 358/471, 400, 497, 487, 488, 406, 401, 521, 518, 504; 250/237 G; 382/59, 313

[56] References Cited

U.S. PATENT DOCUMENTS

| | | |
|---|---|---|
| 4,553,035 | 11/1985 | Malinsky et al. ............ 382/59 |
| 4,684,998 | 8/1987 | Tanioka et al. ............ 358/473 |
| 4,731,668 | 3/1988 | Satomura et al. .......... 358/473 |
| 4,794,544 | 1/1989 | Montgomery et al. ..... 358/473 |
| 4,860,377 | 8/1989 | Ishigaki ..................... 382/59 |
| 5,185,673 | 2/1993 | Sobol ......................... 358/406 |
| 5,282,053 | 1/1994 | Robideau ................... 358/406 |
| 5,327,252 | 7/1994 | Tsuruoka et al. .......... 358/406 |

FOREIGN PATENT DOCUMENTS

| | | | |
|---|---|---|---|
| 0024521 | 3/1981 | European Pat. Off. . | |
| 0180181 | 5/1986 | European Pat. Off. . | |
| 0218177 | 10/1985 | Japan ............... | G06K 9/22 |
| 0218178 | 10/1985 | Japan ............... | G06K 9/22 |
| 0085888 | 4/1988 | Japan ............... | G06K 9/22 |
| 8800712 | 1/1988 | WIPO . | |
| 9005963 | 5/1990 | WIPO . | |

*Primary Examiner*—Edward L. Coles, Sr.
*Assistant Examiner*—Fan Lee
*Attorney, Agent, or Firm*—Helfgott & Karas, P C

[57] ABSTRACT

A device for scanning patterns from a surface of a pad includes in combination a scanner which is moved over the pad surface to read data stored in those patterns, and calibration marks preferably provided on the surface of the pad outside the region carrying the patterns. The calibration marks are detectable by the scanner for comparison with parameters of a scanning process.

14 Claims, 3 Drawing Sheets

PAD FOR USE IN SCANNING DATA STORED ON A FLAT SURFACE

BACKGROUND OF THE INVENTION

The invention pertains to a pad for scanning data stored on a flat surface in data processing equipment.

During a scanning process, essentially text, figures, drawings, images and designs of a general and/or artistic nature are sensed by means of a scanner in order to be sent to a data processing system after storage in a buffer. In this case the scanner cannot be run arbitrarily across the surface being scanned. Rather a regular control along appropriate path sections is required.

In order not to falsify the result of the scan, contact surfaces, called pads, have been used heretofore that will meet the specific demands of surface characteristics, roll resistance etc. In order to prevent a flat data carrier from sliding during the scan, pads were developed with a transparent surface attached to said carrier. This transparent surface rests in its entirety on the pad due to the attachment provided on one edge of the pad—as a kind of a turned page. However, the transparent surface can also be removed from the pad, in which the connection between pad and transparent surface will naturally remain. A flat data carrier is placed between the pad and the transparent surface, so that a layering of transparent surface on the flat data carrier being scanned on the pad will result. The scanner will be set on the transparent surface and in this manner will scan the data carrier underneath.

However, this kind of pad has the disadvantage that significant parameters for the scanning process will not be ascertained. In particular, the scanner cannot be either adjusted or calibrated. An overview of the storage capacity still available in the buffer, is missing entirely.

SUMMARY OF THE INVENTION

It is an object of the invention to avoid disadvantages of the pad of the above type.

This and other objects will be achieved by a device for scanning a pattern, and including calibration mark means detachable by a scanner, for comparison with parameters of the scanning process. Thus it is possible for the user to optimize the scanning process with assistance from ancillary means. Both the location and motion of the scanner, but also the quality of the scanned document will be known to him at any time. Errors in scanning, that in particular necessitate repeat scans, can be avoided.

In one particularly favorable design of the pad according to this invention, the features are integrated into the pad. Thus the features needed for the comparison will be present for the user at any time. Thus the user will have the potential at any time to monitor the scanning process by means of these features. With regard to a carrier for the data stored on a flat surface, there will be a kind of calibration of the features needed for the comparison.

In another design of the pad, the features are provided structurally separate from the pad. The operator can then limit its comparison with parameters of the scanning process only to a quite specific, necessary and short time period. Only in this time period will the features of the pad be used, otherwise they can be stored at another location and are thus not adverse. A refitting of already existing pads without these features is thus possible at any time.

Another preferred design of the invented pad is characterized by a particular design of the pad such that these features allow an adjustment and/or calibration of the scanner and/or an overview of the scan path with respect to the storage space needed for the particular data being scanned. Thus the operator will be able to optimize the scanning process at any particular time point. The scanning motions required for a larger surface will be tailored to each other. Due to the resultant overview of the scan path with respect to the storage size of the buffer, the operator will know precisely where his scanner is located on the pad. After an interruption of the scanning process, a time-consuming search for the suitable site for resumption of the scanning process will be avoided. The location of the interruption of the scanning process will be virtually marked. The scanning process can be continued directly at this site.

In an additional favorable configuration of the invented pad, the features are scale marks and/or lines and/or gray scales and/or grids and/or color fields. With the help of scale marks, but also of the lines, the surface to be scanned can be determined in an optimal manner. Nonessential supplemental symbols will not be scanned. Likewise the vertical profile of the scanner can be controlled. By means of the gray scales the quality of the scanner can be checked. Grids are used to determine the quality of the data to be scanned based on the resolution. The color fields are used exclusively to obtain conclusions about the color quality of the scanned pad.

In an additional design of the pad according to this invention, at least one transparent or translucent upper surface and one contact surface are provided, where carriers for the data stored on the flat surface can be brought between the one transparent surface and the contact surface and the features are provided for comparison with parameters of the scan process in one section—in particular at least in part at the edge of the upper surface. This will prevent the carrier from slipping. The surface being scanned features uniform roll resistance. It is particularly preferred when the upper surface consists of glass or of transparent foil. Errors in the data during scanning can thus be mostly avoided. The contact surface consists preferably of flexible or rigid material, which likewise promotes the uniformity of the scanning process.

In another design of the invented pad the upper and the contact surface are joined together in particular at one or more edges. In an additional preferred design of the invented pad, the upper surface is folded such that it at the same time forms the contact surface at least in part. In the two pads described above, the carrier for the data stored on a flat surface can be brought in a simple manner between the upper surface and the contact surface. The upper surface and contact surface move relative to each other during the insertion process, by folding them together or apart. If the carrier rests at the joint between upper surface and contact surface, a resistance will be imparted to it that prevents slipping of the carrier, in addition to friction forces from the upper surface and contact surface on the carrier. Naturally the upper surface and contact surface can have rectangular, round or even square shape, depending on the particular prevailing conditions. Any other two-dimensional shapes are also possible.

It is preferable to use nearly exclusively those materials that drain electrostatic charges. This will ensure the integrity of the electronics in the scanner. Likewise the charge drain from the scanned pad.

It is particularly preferred when the invented pad has a device to guide the scanner with attachment features that are detachably connected with additional associated attachment features of the upper surface. With the assistance of the device to control the scanner, slipping of the scanner from the specified scan line and direction will be prevented.

Scanners usually feature recesses in their lower front side—and specifically in the two outer regions of the scanner. This means that the scanner features a larger distance from the surface of a scanned surface in these short recess sections than in its middle regions. One of the two recesses of the scanner is used to reach at least part of the way around a device to control the scanner. If a certain lateral pressure is applied manually from the scanner to the device to control the scanner during the scan process, then the scanner can also be moved along this path in contact with the control device. The control device consequently determines the path of the scanner. This is an advantage in particular when for example, several columns of text are to be scanned on one page. For example, if the direction of scanning motion of the scanner were changed due to differently directed external forces applied to a scanner without a controller, then each time the reference system would have to be changed for the letters and numbers to be determined and transmitted. These changes would be associated with a large time requirement. By means of the scanner running parallel with the same control device, this kind of undesirable "adjustment" of the scanner can be prevented. At the same time, the operator of the scanning device need not be familiar with the checking of the scan direction of a scanner. But in order to prevent the control device from slipping off even after strong external force application onto the scanner, it will be detachably mounted by using the particular attachment features at the upper surface of the pad.

In order to be able to move the device to control the scanner quickly and effortlessly from one site of the pad and to attach it again at another location of the pad, the device to control the scanner is designed preferably as a ruler-like element. This element has upper and lower end sections featuring preferably a protrusion, in particular in the shape of a lug as a mounting feature and is removable for detachable connection in correspondingly formed holes as additional attachment features in the upper surface of the pad.

It is particularly preferred when the holes in the upper surface of the pad are located at least in part not in/on features that are read by the scanner. This will prevent the holes from impacting the function and task of the features for comparison with parameters of the scan process. In spite of the use of the control device, the features can continue to serve with their entire information area for comparison with parameters of the scan process.

It is particularly preferred for the connecting path between two mutually associated holes—where the assignment takes place automatically by means of the length of the ruler-like element—to run preferably roughly parallel to the columns of a text being scanned. The operator can thus scan data in the fastest possible manner. The scanning process will also be supported since the holes (or perforations) in the upper and lower section of the upper surface are positioned equidistant to each other. It is self-evident that the holes are not restricted to their location in this preferred configuration. Their positioning is subject to the particular requirements arising from the specific scanning process.

Particularly preferred is a recess in the upper surface, preferably outside of the features read by the scanner and outside of the scan surface, where the recess is used to hold the device to guide the scanner and in particular is adapted to its spatial configuration. Thus the operator will know whether or not he needs a controller to support his scanning operation. If he needs a device to control the scanner, then one simple procedure will make available the needed assets to support his processing.

It is particularly preferred for the device to feature a handle to guide the scanner. This will make it possible for the user to handle the control device manually, in particular to remove the above-mentioned recess in the upper surface of the pad.

DETAILED DESCRIPTION OF THE PREFERRED EMBODIMENTS

Figure 1:
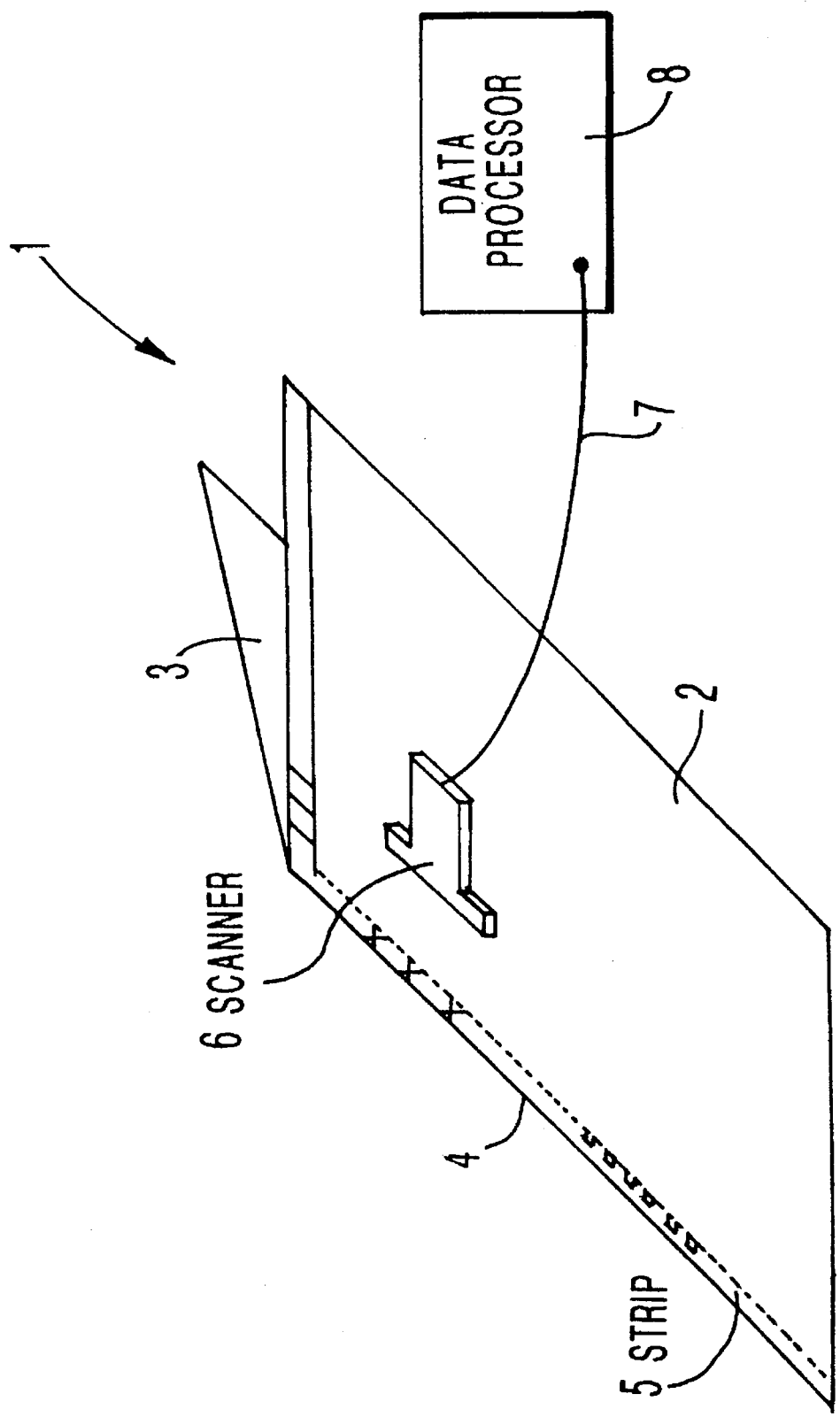
FIG. 1 is a schematic illustration of the scanning of data from a document.

FIG. 1 shows a substrate 1 consisting of an upper surface 2 and a support surface 3. This upper surface 2 and the support surface 3 are joined together at one of their long edges 4. In particular, in the illustrated embodiment the left side of the upper surface 2 is connected on its long side, vertically from the left outer edge, down to the right resolution side (as explained below) with the support surface 3 by means for full-surface adhesion. In the illustrated embodiment the upper surface 2 consists of a transparent foil with a thickness of 370 μm. The support or contact surface 3 consists of flexible conducting material with a thickness of about 2.5 mm.

The upper surface 2 features on its left and also on its upper edge a strip 5 that contains the marks or features to be described below for comparison with parameters of the scanning process.

Figure 2:
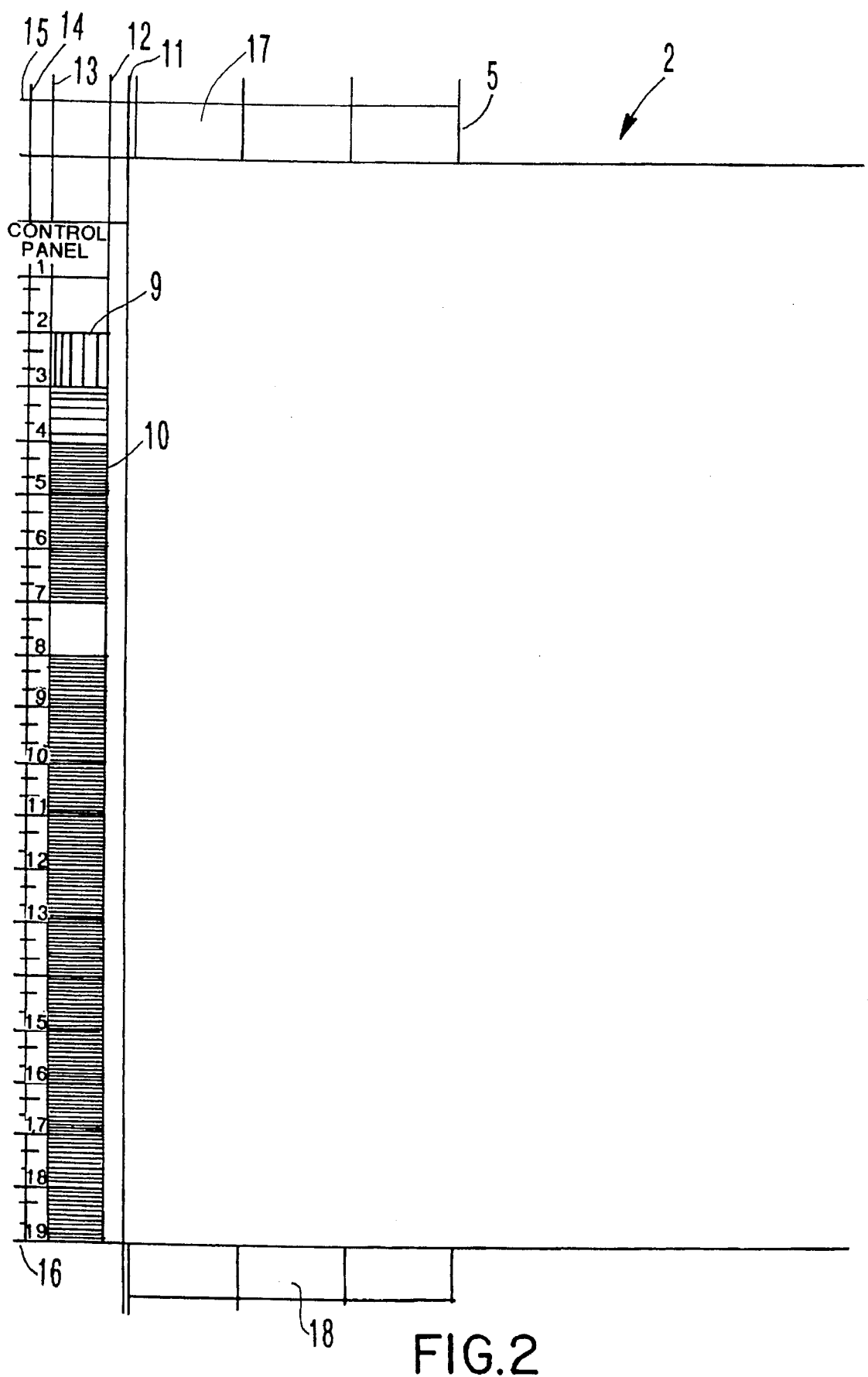
FIG. 2 is a top view of the upper surface with features located in the outer region for comparison with parameters of the scanning process.

A data carrier (not illustrated) is pushed from the right under the upper surface 2 for in the purpose of scanning the embodiment of FIG. 1. The boundary for the carrier is formed by the adhesive surface beginning at a resolution scan line 13 (FIG. 2). Any occurring static charges will be drained across the contact surface 3. It is preferred to imprint the upper surface 2 from the underside by using silk-screening and to provide a wear-resistant coating.

If the data carrier (not illustrated) is located between the upper surface 2 and contact surface 3, then these two surfaces 2, 3 are moved relative to each other so that they clamp the carrier between them. A scanner 6 will be moved across the wear-resistant upper surface 2 and will direct the scanned data along a line 7 to a data processing device 8.

FIG. 2 specifically shows the strip 5 of the upper surface 2. The features for comparison with parameters of the scan process which the strip 5 contains are explained in greater detail below.

If the scanner 6 is moved along a first scan line 11, then it will image only the data to the right of this line 11. If the scanner 6 is moved along a scan line 12, then it will image the data along the scan line 11 according to its control. But in addition, the imaging of scan line 12 will occur in order to be able to verify the vertical run of the scanner 6 on the screen of the data processing device 8.

If the scanner 6 is moved along the resolution scan line 13, then initially the same results can be achieved as for a motion of the scanner along the scan lines 11 and 12. In addition, there will be an image of the resolution FIGS. 9 located one below the other for comparison. Thus the image quality, i.e., the resolution of the scanner 6 can be determined. A readjustment is thus immediately possible. In order to be able to verify the image quality during scanning, underneath the resolution figures there are gray scales 10 or figures or grids provided for comparison. Depending on the requirements, these FIGS. 10 or representations will be marked through during a motion of the scanner 6 along the scan line 13 and provide the corresponding comparison values for the imaging quality.

The movement of the scanner 6 along a scan line 14 also offers the possibility of a continual orientation aid during scanning along the scan lines 11, 12 and 13. As already explained above, the operator will immediately know exactly where he has to begin the scanning process anew in case of an interruption of the scanning process. To do this, he will move the scanner 6 along the scan line 14 and find the scale with imprinted numbers. The numbers are used to help find the proper position of the scanner 6.

Color tuning can be done by using a movement of the scanner 6 along scan lines 15 and 16. A movement of the scanner 6 along scan line 15 will cause scanning of three base colors 17, a movement along scan line 16 will cause scanning of the associated complementary colors 18.

Figure 3:
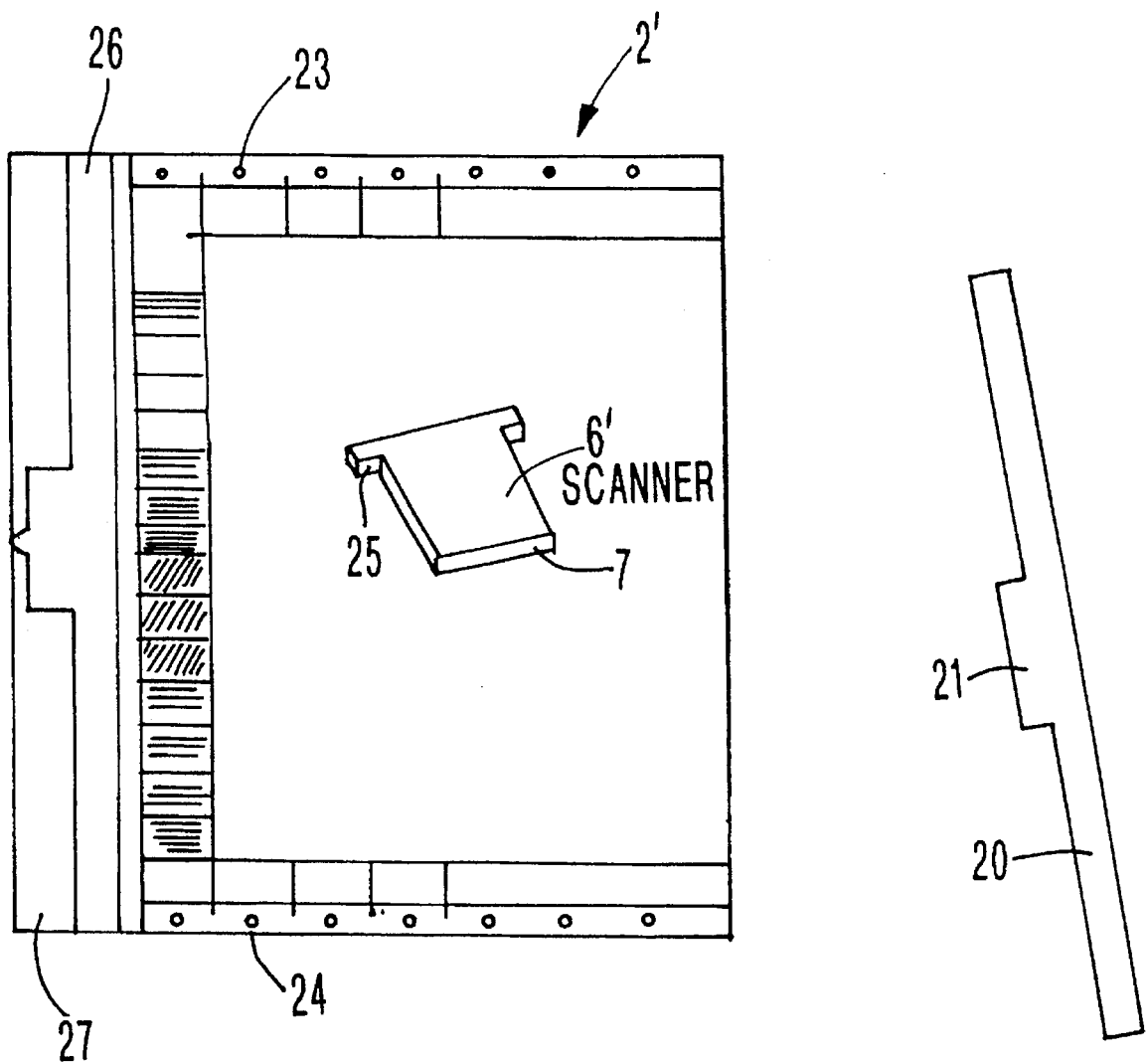
FIG. 3 is a top view of the upper surface with perforations, a ruler-like control element and a recess for this element in the upper surface.

FIG. 3 shows a modification of the upper surface 2', and also additional auxiliary features used for scanning according to a preferred embodiment. A ruler-like element 20 features a handle 21 that is used for a fast and easy manual change of its position.

Figure 4:
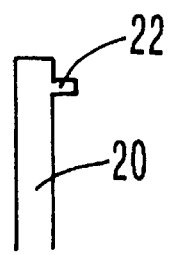
FIG. 4 is a cross section on an enlarged scale through an end section of the ruler-like element with mounting lugs.

FIG. 4 presents an end section of the ruler-like element 20 with a lug-like protrusion 22. This lug-like protrusion 22 is used for detachable mounting of the ruler-like element to the upper surface 2'. For the attachment there are holes 23 in the upper section of the upper surface 2' and in the lower section of the upper surface 2' there are holes 24 to hold the lug-like protrusions 22 located at the ends of the ruler-like element 20. The holes 23 and 24 are equidistant in the embodiment shown in FIG. 3. The ruler-like element 20 can only be positioned due to the spacing of the mutually associated holes 23 and 24, so that it comes to rest parallel with the features 9, 11, 12, 13, 14, 15, 16, 17, 18 (shown in FIG. 2) for comparison with parameters of the scanning process. After placement of the text to be scanned in the pad a movement of the scanner 6' parallel or perpendicular to these features 9, 11, 12, 13, 14, 15, 16, 17, 18 (shown in FIG. 2) is desired; to satisfy this requirement a corresponding arrangement of the holes 23, 24 and a corresponding mounting and arrangement of the ruler-like element 20 are used. The scanner 6' has recesses 25 on its front underside, specifically in its two outer regions. When the ruler-like element 20 is positioned on the upper surface 2', these recesses 25 of the scanner 6' can partly extend over or around the surface of the ruler-like element. The scanner 6' is moved over one of these recesses 25 along the ruler-like element 20.

In order to make the ruler-like element 20 (which is considered as an auxiliary device) available to the operator at any time, a recess 26 is provided in a side section 27 of the upper surface 2'. The shape of the recess 26 corresponds essentially to the shape of the ruler-like element 20. However, it is preferably enlarged in the handle region compared to the space required for the actual handle 21, so that the ruler-like element 20 can be grasped at this point.

I claim:

1. A device for scanning patterns from a surface of a pad, the device comprising in combination:

a scanner adapted to be manually moved over said surface to scan data from said patterns thereon;

a plurality of calibration marks, integrated in said pad and provided on said surface thereof and indicating image resolution parameters required for scanned patterns and being detectable by said scanner as said scanner is moved over said surface for immediate calibration of said scanner during a scanning process of said data so that the scanning process may be controlled by a user comparing said calibration marks with image resolution parameters of said scanning process; and guiding means detachably attached to said pad for guiding said scanner parallel and perpendicular to said calibration marks.

2. The device according to claim 1, wherein said calibration marks are configured to permit adjustment of said scanner for specific data to be scanned.

3. The device according to claim 1, wherein said pad includes a transparent part having said surface and a supporting part so that the patterns for data stored in a two-dimensional form are provided between said transparent part and said supporting part, and said calibration marks are arranged at least partially at an edge of said surface.

4. The device according to claim 3, wherein said transparent part is made of a material selected from the group consisting of glass and a transparent film.

5. The device according to claim 4, wherein said supporting part is made of flexible or rigid material.

6. The device according to claim 5, wherein said transparent part and said supporting part are connected to each other at least at one edge thereof.

7. The device according to claim 3, wherein said transparent part is folded so that it partially simultaneously forms said supporting part.

8. The device according to claim 1, wherein said calibration marks are configured as mark means selected from the group consisting of scales, lines, gray scales, grids and colored fields.

9. The device according to claim 1, wherein said pad is made of a material which discharges electrostatic charges.

10. A device for scanning patterns from a surface of a pad, comprising in combination a scanner adapted to be moved over said surface to scan data from said patterns thereon;

calibration mark means detectable by said scanner for immediate calibration of said scanner during a scanning process of said data so that the scanning process may be controlled by a user comparing said calibration mark means with image resolution parameters of said scanning process; and guiding means detachably-attached to said pad for guiding said scanner relative to said pad, said calibration mark means being integrated in said pad, wherein said guiding means is a ruler-shaped element having a protrusion at each end thereof, said protrusion being shaped as a lug, said pad having holes each for detachably-receiving a respective protrusion of said ruler-shaped element.

11. The device according to claim 10, wherein said holes are provided outside of a region of said pad having said calibration mark means thereon.

12. The device according to claim 11, wherein said holes are positioned in an upper section and a lower section of said surface in rows, said holes in each row being positioned equidistant to each other.

13. The device according to claim 10, wherein an imaginary connecting path between two mutually associated holes for said ruler-shaped element runs parallel to columns of a text representing said patterns being scanned.

14. The device according to claim 10, wherein a recess is provided in said pad at said surface in a region outside of said calibration mark means, for holding said ruler-shaped element when not in use.

\* \* \* \* \*